United States Patent Office 3,740,186
Patented June 19, 1973

3,740,186
CONTINUOUS DYEING OF SYNTHETIC FIBRES WITH WATER IMMISCIBLE ORGANIC SOLVENTS AND AMINO ANTHRAQUINONES
Volker Hederich and Gunter Gehrke, Cologne, Rutger Neeff, Leverkusen, and Peter Wegner, Cologne, Germany, assignors to Bayer Aktiengesellschaft, Leverkusen, Germany
No Drawing. Filed Aug. 21, 1970, Ser. No. 66,066
Claims priority, application Germany, Aug. 27, 1969, P 19 43 535.9
Int. Cl. C09b 1/40, 1/42; D06p 1/20
U.S. Cl. 8—39                                    9 Claims

ABSTRACT OF THE DISCLOSURE

Process for the continuous dyeing of synthetic fibre materials from organic solvents characterised in that the fibre materials are impregnated with dyeing liquors which contain anthraquinone dyestuffs of formula

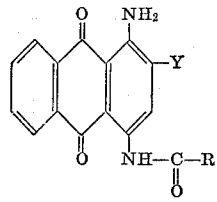

in which R denotes a $C_1$–$C_{17}$-alkyl or $C_3$–$C_{17}$-alkenyl radical, and Y represents a hydrogen, chlorine or bromine atom or a radical —X—$R_1$, in which X denotes oxygen or sulphur and $R_1$ is a $C_1$–$C_{18}$-alkyl, aralkyl, alkoxyalkyl, aralkoxyaikyl or aryloxyalkyl radical or a phenyl radical optionally substituted by $C_1$–$C_9$-alkyl, cycloalkyl, aralkyl, $C_1$–$C_5$-alkoxy, $C_1$–$C_5$-alkylmercapto or $C_1$–$C_6$-alkoxycarbonyl groups and/or chlorine atoms, with the proviso that the sum of the carbon atoms present in total in R and Y is at least 4 and at most 35, and that the fibre materials are subsequently subjected to a heat treatment.

The dyeings obtained are distinguished by high dyestuff yield, very good build-up and excellent fastness properties, especially very good fastness to thermofixing, washing, rubbing and light.

---

The invention relates to a process for the continuous dyeing of synthetic fibre materials from organic solvents; the process is characterised in that the fibre materials are impregnated with dyestuff liquors which contain anthraquinone dyestuffs of formula

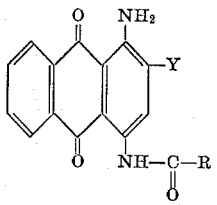

(I)

in which

R denotes a $C_1$–$C_{17}$-alkyl, preferably $C_4$–$C_{17}$-alkyl radical, or a $C_3$–$C_{17}$-alkenyl radical, and Y represents a hydrogen, chlorine or bromine atom or a radical —X—$R_1$, in which X denotes oxygen or sulphur and $R_1$ is a $C_1$–$C_{18}$-alkyl, preferably $C_4$–$C_{12}$-alkyl radical or an aralkyl, alkoxyalkyl, aralkoxyalkyl or aryloxyalkyl radical or a phenyl radical which is optionally substituted by $C_1$–$C_9$-alkyl, cycloalkyl, aralkyl, $C_1$–$C_5$-alkoxy, $C_1$–$C_5$-alkylmercapto or $C_1$–$C_6$-alkoxycarbonyl radicals and/or chlorine atoms, with the proviso that the sum of the carbon atoms present in total in R and Y is at least 4 and at most 35, and that the fibre materials are subsequently subjected to a heat treatment.

Radicals which can be R are, for example, as $C_1$–$C_{17}$-alkyl radicals, the methyl, ethyl, propyl, iso-propyl, n-butyl, iso-butyl, sec.-butyl, tert.-butyl, n-pentyl, iso-pentyl, n-hexyl, iso-hexyl, n-heptyl, 2-ethyl-pentyl, n-nonyl, n-decyl, n-undecyl, n-tridecyl, n-pentadecyl and the n-heptadecyl radical, and as $C_3$–$C_{17}$-alkenyl radicals, the propenyl, butenyl, octenyl, decenyl and the octadecen-9-yl radical.

For $R_1$, there may for example be mentioned: as alkyl radicals, the methyl, ethyl, propyl, iso-propyl, iso-butyl, sec.-butyl, tert.-butyl, iso-amyl, sec.-pentyl, neopentyl, methyl-pentyl, dimethyl-butyl, methyl-hexyl, dimethyl-pentyl, trimethyl-butyl, iso-octyl, methyl-heptyl, dimethyl-hexyl, trimethyl-pentyl, tetramethyl-butyl, iso-nonyl, di-methyl-heptyl, trimethyl-hexyl, n-decyl, dimethyloctyl, n-dodecyl, n-hexadecyl and the n-octadecyl radical; as aralkyl radicals, the benzyl, methyl-benzyl, methoxy-benzyl, phenyl-ethyl, phenyl-propyl and phenyl-butyl radical; as alkoxyalkyl radicals, the methoxy-ethyl, ethoxy-ethyl, propoxy-ethyl, iso-propoxy-ethyl, n-butoxy-ethyl, tert.-butoxy-ethyl, n-hexoxy-ethyl, ethyl-hexoxy-ethyl, ethoxy-propyl, tert.-butoxy-propyl, ethoxy-iso-propyl, methoxy-butyl, ethoxy-butyl, methoxy-iso-butyl and the ethoxy-hexyl radical; further, the (2-butoxy-ethoxy)-ethyl and the [2-(ethyl-hexoxy)-ethoxy]-ethyl radical; as aralkoxy-alkyl radicals, the benzyloxy-ethyl, methyl-benzyloxy-ethyl, methoxy-benzyl-ethyl and the benzyloxy-propyl radical; as aryloxyalkyl radicals, the phenoxy-ethyl, methyl-phenoxy-ethyl, ethyl-phenoxy-ethyl, propyl-phenoxy-ethyl, iso-propyl-phenoxy-ethyl, methyl-iso-propyl-phenoxy-ethyl, di-iso-propyl-phenoxy-ethyl, tert.-butyl-phenoxy-ethyl, cyclohexyl-phenoxy-ethyl, iso-hexyl-phenoxy-ethyl, α,α-dimethyl-benzyl - phenoxy-ethyl, iso-octyl-phenoxy-ethyl, chloro-phenoxy-ethyl, methoxy-phenoxy-ethyl, methyl-mercapto-phenoxy-ethyl, ethoxy-carbonyl-phenoxy-ethyl, propoxy - carbonyl - phenoxy-ethyl, btuoxy-carbonyl-phenoxy-ethyl, phenoxypropyl, cyclohexyl-phenoxy-propyl, phenoxy - iso-propyl, benzyl-phenoxy-iso-propyl, ethyl-phenoxy-iso-propyl, phenoxy-iso-butyl, methyl-phenoxy-iso-butyl and the chlorophenoxy-iso-butyl radical; as phenyl radicals which are optionally substituted by $C_1$–$C_9$-alkyl, cycloalkyl, aralkyl, $C_1$–$C_5$-alkoxy, $C_1$–$C_5$-alkyl mercapto or $C_1$–$C_6$-alkoxycarbonyl groups and/or chlorine atoms, the phenyl, methyl-phenyl, ethyl-phenyl propyl-phenyl, iso-propyl-phenyl, sec.-butyl-phenyl, tert.-butyl-phenyl, di-methyl-phenyl, tri-methyl-phenyl, di-iso-propyl-phenyl, methyl-iso-propyl-phenyl, iso-hexyl-phenyl, iso-octyl-phenyl, cyclo-hexyl-phenyl, α,α - dimethyl-benzyl-phenyl, benzyl-phenyl, methoxy-phenyl, ethoxy-phenyl, methyl-mercapto-phenyl, chlorophenyl, dichloro-phenyl, methyl-chloro-phenyl, methoxy-carbonyl-phenyl, ethoxy-carbonyl-phenyl, propoxy-carbonyl-phenyl, iso-propoxy-carbonyl-phenyl, butoxy-carbonyl-phenyl, amyloxy-carbonyl-phenyl and the hexoxy-carbonyl-phenyl radical.

Preferred anthraquinone dyestuffs of Formula I are those in which R is a $C_1$–$C_{17}$-alkyl, preferably $C_4$–$C_{17}$-alkyl radical, or is a $C_3$–$C_{17}$-alkenyl radical, and Y has one of the following four meanings:

(I) a hydrogen atom,
(II) —$OR_1$, wherein $R_1$ is a $C_1$–$C_{18}$-alkyl, aralkyl, alkoxyalkyl or aralkoxyalkyl radical or an optionally substituted aryloxyalkyl radical, (III) —SR₁, wherein R₁ is a $C_1$–$C_{18}$-alkyl radical, and (IV) 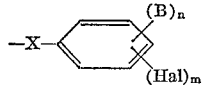

wherein

X is oxygen or sulphur,

B represents hydrogen or a $C_1$–$C_9$-alkyl, cycloalkyl, aralkyl, $C_1$–$C_5$-alkoxy, $C_1$–$C_5$-alkylmercapto or $C_1$–$C_6$-alkoxycarbonyl radical, Hal denotes a chlorine or bromine atom and $n$ is a number from 1–3 and $m$ is a number from 0–2.

with the proviso that the sum of the carbon atoms present in total in R and Y is at least 4 and at most 35 also applying to these preferred anthraquinone dyestuffs.

The dyestuffs used according to the invention for dyeing from organic solvents are obtained according to methods which are in themselves known, for example by reaction of suitable 1,4-diamino-anthraquinones with alkyl- or alkenyl-carboxylic acid chlorides in inert solvents, optionally in the presence of inorganic or organic bases, or from 1-amino-2-halogen-4-acyl-amino-anthraquinones which are suitable for the process according to the invention by reaction with mercaptoalkyl or -aryl compounds.

Possible organic solvents for the process according to the invention are those which are immiscible with water and of which the boiling points lie between 40 and 150° C., for example aromatic hydrocarbons, such as toluene and xylene and halogenated hydrocarbons, especially aliphatic chloro-hydrocarbons, such as methylene chloride, chloroform, carbon tetrachloride, 1,1-dichlorethane, 1,2-dichlorethane, 1,1,2 - trichlorethane, 1,1,1,2 - tetrachlorethane, 1,1,2,2-tetrachlorethane, pentachlorethane 1-chloropropane, 1,2-dichloropropane, 1,1,1-trichloropropane, 1-chlorobutane, 2-chlorobutane, 1,4-dichlorobutane, 1-chloro-2-methylpropane or 2-chloro-2-methylpropane, as well as aliphatic fluoro- or fluoro-chloro-hydrocarbons, such as perfluoro-n-hexane, 1,2,2-trifluorotrichlorethane and 1,1,1-trifluoro-pentachloropropane, and aromatic-chloro- and fluorohydrocarbons, such as chlorobenzene, fluorobenzene, chlorotoluene and benzotrifluoride.

Tetrachlorethylene, trichlorethylene and 1,1,1-trichlorethane have proved particularly suitable. Mixtures of these solvents can also be used.

The synthetic fibre materials to be dyed according to the process of the invention are especially fibre materials of polyesters, for example polyethylene terephthalates or polyesters from 1,4-bis-(hydroxymethyl)-cyclohexane and terephthalic acid, of cellulose triacetate, of synthetic polyamides, such as poly-ε-caprolactam, polyhexamethylenediamine adipate or poly-ω-aminoundecane-acid, of polyurethanes or of polyolefins. The fibre materials can be in the form of woven fabrics and knitted fabrics.

For dyeing, the dyestuffs to be used according to the invention are dissolved in the organic solvents which are immiscible with water or added to them in the form of solutions in solvents which are infinitely miscible with these solvents, such as alcohols, dimethylformamide, dimethylacetamide, dimethylsulphoxide or sulpholane, and the synthetic fibre materials are impregnated with the resulting clear dyestuff solutions, which can optionally additionally contain soluble non-ionic auxiliary agents for improving the uniformity of the dyeings, for example the known surface-active oxethylation and propoxylation products of fatty alcohols, alkylphenols, fatty acid amides and fatty acids. Thereafter the dyestuffs are fixed to the fibre materials by a heat treatment. The heat treatment can consist of a brief dry heat treatment at 120–230° C., it being possible for the dry treatment to be preceded by an intermediate drying, or can consist of a treatment of the fibre materials in superheated solvent vapour at 100–150° C. Small amounts of non-fixed dyestuff can be eluted by brief treatment with the cold organic solvent. It should be pointed out that mixtures of the dyestuffs to be used according to the invention at times give a better colour yield than the individual dyestuffs and may show a better solubility in the organic medium.

Using the process according to the invention it is possible, when dyeing from organic solvents, to achieve dyeings on synthetic fibre materials which are distinguished by high dyestuff yield, very good build-up and excellent fastness properties, especially very good fastness to thermofixing, washing, rubbing and light. A further advantage of the dyestuffs to be used according to the invention is their high solubility in organic solvents, especially in tetrachlorethylene, trichlorethylene, 1,1,1 - trichlorethane and 1,1,1-trichloropropane, which makes it possible to carry out the dyeing even without the use of solubilising agents.

The parts indicated in the examples which follow are parts by weight.

EXAMPLE 1

A woven fabric of polyethylene terephthalate fibres is impregnated at room temperature with a clear red solution which contains 10 parts of 1-amino-2-phenoxy-4-n-lauroylamino-anthraquinone in 990 parts of tetrachlorethylene. After squeezing-out to a weight increase of 60% the woven fabric is dried for one minute at 80° C. Thereafter the dyestuff is fixed by heating the woven fabric to 190–220° C. for 45 seconds. Thereafter the small amount of non-fixed dyestuff is eluted by brief treatment in cold tetrachlorethylene. After drying, a clear bluish-tinged red dyeing is obtained, which is distinguished by its high dyestuff yield, very good build-up and excellent fastness properties, especially very good fastness to thermofixing, washing, rubbing and light.

Equivalent clear red dyeings were also obtained analogously on woven fabrics of (a) cellulose triacetate, (b) synthetic polyamides or polyurethanes and (c) polypropylene fibres; the only difference was that the thermosol treatment was carried out at 200–220° C. for (a), at 170–200° C. for (b) and at 120–150° C. for (c).

Equivalent dyeings were also obtained if the 990 parts of tetrachlorethylene were replaced by the same amount of one of the following solvents: methylene chloride, chloroform, carbon tetrachloride, dichlorethane, trichlorethane, trichlorethylene, tetrachlorethane, dichloropropane, 1,1,1-trichloropropane, chlorobutane, dichlorobutane, perfluoro-n-hexane, 1,2,2-trifluorotrichlorethane and 1,1,1-trifluoro-pentachloropropane.

The dyestuff used had been manufactured as follows: 15 parts of 1,4-diamino-2-phenoxy-anthraquinone were dissolved in 100 parts of N-methylpyrrolidone and mixed at about 30° C. with a solution of 15 parts of lauric acid chloride in 20 parts of N-methylpyrrolidone. After a further 30 minutes' stirring at 30° C., the reaction mixture was mixed with 200 parts of methanol and the dyestuff which had separated out was filtered off and washed with methanol and water. 22.3 parts of dyestuff were obtained, melting at 100–101° C. after recrystallisation from pyridine.

EXAMPLE 2

A knitted fabric of polyhexamethylenediamine adipate filaments is impregnated at room temperature with a clear red solution which contains 10 parts of 1-amino-2-(2-butoxy-ethoxy)-4-stearoylamino-anthraquinone and 7 parts of nonylphenol heptaglycol ether in 983 parts of tetrachlorethylene. After squeezing out to a weight increase of 60% the knitted fabric is dried for one minute at 80° C. Thereafter the dyestuff is fixed by heating the knitted fabric to 192° C. for 45 seconds. Small amounts of non-fixed dyestuff are then eluted by brief treatment, lasting about 20 seconds, in cold tetrachlorethylene. After drying, a clear bluish-tinged red dyeing is obtained which is distinguished by its high dyestuff yield, very good build-up and excellent fastness properties, especially very good fastness to thermofixing, washing, rubbing and light.

An equivalent clear bluish-tinged red dyeing was obtained analogously on woven fabrics of anionically modified polyhexamethylenediamine adipate.

An equivalent dyeing was also obtained if instead of the 983 parts of tetrachlorethylene the same amount of toluene, xylene, chlorobenzene, dichlorobenzene or 1,2,2-trifluorotrichlorethane was used.

The dyestuff used had been manufactured as described in Example 1, except that instead of 1,4-diamino-2-phenoxyanthraquinone 1,4 - diamino-2-(2-butoxy-ethoxy)-anthraquinone was used and instead of lauric acid chloride stearic acid chloride was used.

EXAMPLE 3

A woven fabric of polypropylene fibres is impregnated at room temperature with a clear red solution which contains 10 parts of 1-amino-2-n-octyloxy-4-iso-valeroyl-amino-anthraquinone and 7 parts of nonylphenol heptaglycol ether in 983 parts of tetrachlorethylene. After squeezing out to a weight increase of 60% the woven fabric is dried for one minute at 80° C. Thereafter the dyestuff is fixed by heating the woven fabric to 140° C. for 30 seconds. Non-fixed amounts of dyestuff can be eluted by brief treatment in cold solvent. A clear, bluish-tinged red dyeing is obtained, which is distinguished by high dyestuff yield, very good build-up and excellent fastness properties, especially very good fastness to thermofixing, washing, rubbing and light.

The dyestuff used had been manufactured as follows: 10 parts of 1,4-diamino-2-n-octyloxy-anthraquinone were dissolved in 100 parts of pyridine and mixed with 8 parts of iso-valeroyl chloride at 30–40° C. Thereafter the mixture was stirred for about one hour longer at this temperature. The dyestuff formed was then separated out by adding 100 parts of methanol and after filtering off was washed with methanol and water. 12.1 parts of the above-mentioned dyestuff were obtained.

EXAMPLE 4

A woven fabric of poly-1,4-cyclohexanedimethylene terephthalate is impregnated at room temperature with a clear red solution which contains 10 parts of 1-amino-2-n-dodecylmercapto - 4 - iso-valeroyl-amino-anthraquinone and 7 parts of nonylphenol heptaglycol ether in 983 parts of tetrachlorethylene. After squeezing out to a weight increase of 60%, the woven fabric is dried for one minute at 80° C. Thereafter the dyestuff is fixed by heating the woven fabric to 190–220° C. for 45 seconds. The small amount of non-fixed dyestuff is then eluted by brief treatment in cold tetrachlorethylene. After drying, a clear ruby-red dyeing is obtained, which is distinguished by its high dyestuff yield, very good build-up and excellent fastness properties, especially very good fastness to thermofixing, washing, rubbing and light.

A clear bluish-tinged red dyeing is obtained analogously on anionically modified polyethylene terephthalate filaments.

The dyestuff used had been manufactured as follows: 10 parts of 1-amino-2-bromo-4-iso-valeroylamino-anthraquinone in 100 parts of pyridine were briefly warmed to 60° C. with 3 parts of powdered potassium hydroxide and 10 parts of n-dodecylmercaptan. After adding 150 parts of methanol and 5 parts of glacial acetic acid the reaction mixture was cooled with ice. The dyestuff which had separated out was filtered off and washed with methanol and water. 12.2 parts of dyestuff were obtained, melting at 85–86° C. after recrystallisation from glacial acetic acid.

EXAMPLE 5

A woven fabric of polyethylene terephthalate fibres is impregnated at room temperature with a clear red solution, which contains 10 parts of 1-amino-2-(p-tert.-butyl-phenylmercapto) - 4 - lauroylamino-anthraquinone and 7 parts of nonylphenol heptaglycol ether in 983 parts of tetrachlorethylene. After squeezing out to a weight increase of 60%, the woven fabric is dried for one minute at 80° C. Thereafter the dyestuff is fixed by heating the woven fabric to 190–220° C. for 45 seconds. The small amount of non-fixed dyestuff is then eluted by brief rinsing with cold tetrachlorethylene. After drying, a clear ruby-red dyeing is obtained, which is distinguished by its high dyestuff yield, very good build-up and excellent fastness properties, especially very good fastness to thermofixing, washing, rubbing and light.

The dyestuff used was manufactured as described in Example 4, except that 1-amino-2-bromo-4-iso-valeroyl-amino-anthraquinone was replaced by 1-amino-2-bromo-4-lauroylamino-anthraquinone and n-dodecylmercaptan was replaced by p-tert.-butylmercaptophenol. 10.8 parts of the above-mentioned compound were obtained, melting at 64–65° C. after recrystallisation from glacial acetic acid.

EXAMPLE 6

A woven fabric of polyethylene terephthalate fibres is impregnated at room temperature with a clear red solution which contains 10 parts of 1-amino-2-(4-pentoxycarbonylphenoxy)-4-steroylamino-anthraquinone in 990 parts of 1,1,1-trichloroethane. After squeezing out to a weight increase of 60%, the dystuff is fixed by heating the woven fabric with superheated 1,1,1-trichlorethane vapour at 140° C. for 45 seconds. Thereafter the small amount of non-fixed dyestuff is eluted by brief rinsing in cold 1,1,1-trichlorethane. After drying, a clear bluish-tinged red dyeing is obtained which is distinguished by its high dyestuff yield, very good build-up and excellent fastness properties.

The dyestuff used has been manufactured as follows: 20 parts of 1,4-diamino-2-(4-pentyloxycarbonyl-phenoxy)-anthraquinone were dissolved in 400 parts of N-methylpyrrolidone. The solution was mixed at about 30° C. with 20 parts of n-stearoyl chloride and subsequently stirred for a further hour at 30–40° C. The dyestuff formed was separated out from the reaction mixture by adding 250 parts of methanol, filtered off, and washed with methanol and water. 30.4 parts of dyestuff were obtained.

EXAMPLE 7

A woven fabric of poly-1,4-cyclohexanedimethylene terephthalate is impregnated at room temperature with a clear red solution which contains 10 parts of 1-amino-2-benzyloxy-4-lauroylamino-anthraquinone in 990 parts of tetrachlorethylene. After squeezing out to a weight increase of 60%, the dyestuff is fixed by heating the woven fabric with superheated tetrachlorethylene vapour at 150° C. for 35 seconds. The small amount of non-fixed dyestuff is then eluted by brief rinsing in cold tetrachlorethylene. After drying, a clear bluish-tinged red dyeing is obtained, which is distinguished by its high dyestuff yield, very good build-up and excellent fastness properties.

The dyestuff used had been manufactured as described in Example 6, except that instead of the 90 parts of 1,4-diamino-2-(4 - pentoxycarbonyl-phenoxy)-anthraquinone an equivalent amount of 1,4-diamino-2-benzyloxy-anthraquinone was reacted with 15 parts of n-lauric acid chloride. 25.2 parts of dyestuff were obtained.

Clear bluish-tinged red to ruby-red dyeings, having excellent fastness properties, on woven fabrics of polyester, triacetate, polyamide, polyurethane and polyolefine fibres were also obtained if instead of the indicated dyestuff the same amount of one of the dyestuffs indicated in the table which follows was used:

| Example | Dyestuff |
|---|---|
| 8 | 1-amino-2-(p-iso-octyl-phenoxy)-4-acetylamino-anthraquinone |
| 9 | 1-amino-2-n-decyloxy-4-propionylamino-anthraquinone |
| 10 | 1-amino-2-(2-[2-iso-propyl-3-methyl-phenoxy]-ethoxy)-4-butyrylamino-anthraquinone |
| 11 | 1-amino-2-p-tert.-butyl-phenoxy-4-butyrylamino-anthraquinone |
| 12 | 1-amino-2-(2-ethylphenoxy)-4-(2-methylbutyryl-amino)-anthraquinone |
| 13 | 1-amino-2-n-pentyloxy-4-(2,2-dimethylpropionyl-amino)-anthraquinone |
| 14 | 1-amino-2-phenoxy-4-(2-ethylbutyrylamino)-anthraquinone |
| 15 | 1-amino-2-(2-butoxyethoxy)-4-(2-ethyl-2-butyl-acetyl-amino)-anthraquinone |
| 16 | 1-amino-2-p-chlorophenoxy-4-n-tetradecanoyl-amino-anthraquinone |
| 17 | 1-amino-2-(1-phenylethoxy)-4-n-dodecanoyl-amino-anthraquinone |
| 18 | 1-amino-2-(3-phenoxypropoxy)-4-hexadecanoyl-amino-anthraquinone |
| 19 | 1-amino-2-[1-methyl-2-(4-cyclohexylphenoxy)-ethoxy]-4-(3-methyl-butyrylamino)-anthraquinone |
| 20 | 1-amino-2-(2-[2-butoxyethoxy]-ethoxy)-4-dodecanoylamino-anthraquinone |
| 21 | 1-amino-2-(1,3-bis-p-tert.-butyl-phenoxy-iso-propoxy)-4-octadecanoylamino-anthraquinone |
| 22 | 1-amino-2-n-butylmercapto-4-hexadecanoyl-amino-anthraquinone |
| 23 | 1-amino-2-n-pentylmercapto-4-(2-ethyl-butyryl-amino)-anthraquinone |
| 24 | 1-amino-2-p-tert.-butyl-phenylmercapto-4-oleoyl-amino-anthraquinone |
| 25 | 1-amino-2-n-dodecylmercapto-4-undecen-1-oylamino-anthraquinone |
| 26 | 1-amino-2-n-docylmercapto-4-methacryloylamino-anthraquinone |
| 27 | 1-amino-2-(3-methoxy-butoxy)-4-n-dodecanoyl-amino-anthraquinone |
| 28 | 1-amino-2-(4-methoxy-phenoxy)-4-stearoyl-amino-anthraquinone |
| 29 | 1-amino-2-(2-ethylhexoxy)-4-(3-methylbutyryl-amino)-anthraquinone |
| 30 | 1-amino-2-(2-(4-[α,α-dimethylbenzyl]-phenoxy)-ethoxy)-4-n-pentane-carbonylamino-anthraquinone |
| 31 | 1-amino-2-chloro-4-tetradecanoylamino-anthraquinone |
| 32 | 1-amino-2-bromo-4-hexadecanoylamino-anthraquinone |
| 33 | 1-amino-2-bromo-4-(2-ethyl-2-butyl-acetyl-amino)-anthraquinone |
| 34 | 1-amino-2-n-hexadecyl-mercapto-4-iso-valeroyl-amino-anthraquinone |
| 35 | 1-amino-2-(1-ethyl-butyl-mercapto)-4-decanoyl-amino-anthraquinone |
| 36 | 1-amino-2-(4-methoxy-phenyl-mercapto)-4-(2-ethyl-butyrylamino)-anthraquinone |
| 37 | 1-amino-2-(1,1,3,3-tetramethyl-butyl-mercapto)-4-(2-methyl-butyrylamino)-anthraquinone |
| 38 | 1-amino-2-(4-cyclohexyl-phenoxy)-4-tetra-decanoyl-amino-anthraquinone |
| 39 | 1-amino-2-(4-methyl-mercapto-phenoxy)-4-iso-valeroylamino-anthraquinone |
| 40 | 1-amino-2-(3,5-di-iso-propyl-phenoxy)-4-(2-methyl-butyrylamino)-anthraquinone |
| 41 | 1-amino-4-(2-methyl-butyrylamino)-anthra-quinone |
| 42 | 1-amino-4-(ethyl-butyl)-acetylamino-anthra-quinone |
| 43 | 1-amino-4-(lauroylamino)-anthraquinone |
| 44 | 1-amino-4-tetradecanoylamino-anthraquinone |
| 45 | 1-amino-4-stearoylamino-anthraquinone |
| 46 | 1-amino-2-chloro-4-(ethyl-butyl)-acetylamino-anthraquinone |

EXAMPLE 47

A woven fabric of cellulose triacetate fibres is impregnated at room temperature with a clear red solution which contains 10 parts of a dyestuff mixture of 5 parts of 1-amino-2-bromo-4-stearoylamino-anthraquinone and 5 parts of 1-amino-2-bromo-4-iso-valeroylamino-anthraquinone and 7 parts of nonylphenol heptaglycol ether in 983 parts of tetrachlorethylene. After squeezing out to a weight increase of 60%, the woven fabric is dried for one minute at 80° C. Thereafter the dyestuff is fixed by heating the woven fabric to 215° C. for one minute. A clear bluish-tinged red dyeing is obtained which is distinguished by high dyestuff yield, very good build-up and excellent fastness properties, especially very good fastness to thermofixing, washing, rubbing and light.

The dyestuff used had been manufactured as follows: a solution of 20 parts of 1,4-diamino-2-bromo-anthraquinone in 150 parts of N-methylpyrrolidone was mixed with 5 parts of iso-valeroyl chloride, stirred for ½ hour at 30–35° C., mixed with 12 parts of stearoyl chloride and again stirred for ½ hour at 30–40° C. The dyestuff mixture which had separated out was filtered off after addition of 200 parts of methanol, washed with methanol and water, and dried. 25.8 parts of a dyestuff mixture consisting of about equal parts of the above-mentioned dyestuffs were obtained.

We claim:

1. Process for the continuous dyeing of synthetic polyester fibre material comprising the steps of
   (A) impregnating the fiber material with a non-aqueous dyeing liquor, said liquor consisting essentially of an organic solvent and an anthraquinone dyestuff; said organic solvent consisting of water-immiscible halogenated hydrocarbon having a boiling point of 40° C. to 150° C. and said anthraquinone dyestuff having the formula

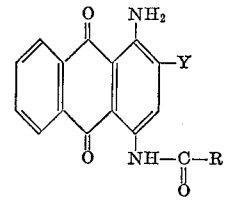

in which R is $C_1$–$C_{17}$-alkyl or $C_3$–$C_{17}$-alkenyl; Y is —X—$R_1$ in which X is oxygen or sulfur; and $R_1$ is $C_1$–$C_{18}$-alkyl, aralkyl, alkoxyalkyl, aralkoxyalkyl, aryloxyalkyl, phenyl, or phenyl substituted by $C_1$–$C_9$-alkyl, cycloalkyl, aralkyl, $C_1$–$C_5$-alkoxy, $C_1$–$C_5$-alkylmercapto, $C_1$–$C_6$-alkoxycarbonyl or chlorine; with the proviso that the sum of the carbon atoms in R and Y is 4 to 35; and (B) subjecting the fiber material to a heat treatment to fix said dyestuff on said polyester fibre material.

2. The process of claim 1 in which said anthraquinone dyestuff has the formula

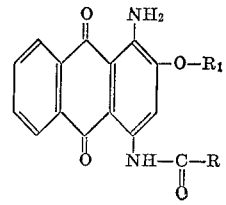

in which $R_1$ is $C_1$–$C_{18}$-alkykl, aralkyl, alkoxyalkyl, aralkoxyalkyl or aryloxyalkyl; with the proviso that the sum of the carbon atoms in R and $R_1$ is 4 to 35.

3. The process of claim 1 in which the anthraquinone dyestuff has the formula

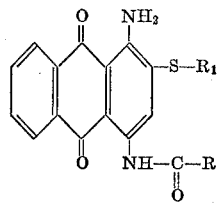

in which $R_1$ is $C_1$–$C_{18}$-alkyl; with the proviso that the sum of the carbon atoms in R and $R_1$ is 4 to 35.

4. The process of claim 1 in which the anthraquinone dyestuff has the formula

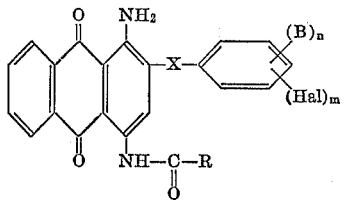

in which
 X is oxygen or sulfur;
 B is hydrogen, $C_1$–$C_9$-alkyl, cycloalkyl, aralkykl, $C_1$–$C_5$-alkoxy, $C_1$–$C_5$-alkylmercapto or $C_1$–$C_6$-alkoxycarbonyl;
 Hal is chlorine or bromine;
 n is a number from 1–3; and
 m is a number from 0–2;
with the proviso that the sum of the carbon atoms in R and B is at most 29.

5. The process of claim 1 in which $R_1$ is aryloxyalkyl selected from the group consisting of phenoxy-alkyl; and phenoxy-alkyl substituted in the phenyl group with $C_1$–$C_8$-alkyl, cyclohexyl, benzyl, dimethyl-benzyl, chloro, methoxy, methylmercapto, ethoxy carbonyl, propoxy carbonyl or butoxycarbonyl.

6. The process of claim 1 in which said anthraquinone dyestuff is soluble in said water-immiscible organic solvent.

7. The process of claim 1 in which the dyed material is subjected to a subsequent step of (C) rinsing with water-immiscible organic solvent in which said anthraquinone dyestuff is soluble.

8. The process of claim 1 in which said water-immiscible organic solvent is an aliphatic chlorohydrocarbon having a boiling point of between 40 and 150° C.

9. The process of claim 1 in which said water-immiscible organic solvent is selected from the group consisting of tetrachloroethylene, trichloroethylene, 1,1,1-trichloroethane, 1,1,1-trichloropropane and mixtures thereof.

References Cited

UNITED STATES PATENTS

| | | | |
|---|---|---|---|
| 2,155,673 | 4/1939 | Miller | 260—377 |
| 3,510,243 | 5/1970 | Seuret et al. | 8—39 |
| 2,060,186 | 11/1936 | Felix et al. | 8—25 |
| 2,828,180 | 3/1958 | Sertorio | 8—62 |

FOREIGN PATENTS

| | | |
|---|---|---|
| 1,217,380 | 12/1970 | Great Britain. |
| 1,045,839 | 10/1966 | Great Britain. |

GEORGE F. LESMES, Primary Examiner

P. C. IVES, Assistant Examiner

U.S. Cl. X.R.

8—25; 260—377